(12) United States Patent
Kitazawa et al.

(10) Patent No.: US 9,463,884 B2
(45) Date of Patent: Oct. 11, 2016

(54) SPACE DEBRIS REMOVING DEVICE AND SPACE DEBRIS REMOVING METHOD

(71) Applicants: IHI CORPORATION, Tokyo (JP); IHI AEROSPACE CO., LTD., Tokyo (JP)

(72) Inventors: Yukihito Kitazawa, Tokyo (JP); Aritsune Kawabe, Tokyo (JP); Kozue Hashimoto, Tokyo (JP); Mitsuharu Sonehara, Tokyo (JP); Masaru Uji, Tokyo (JP); Shinya Morita, Tokyo (JP); Katsuaki Nomura, Tokyo (JP); Ayumi Nakanishi, Tokyo (JP)

(73) Assignee: IHI Corporation, Tokyo (JP)

( * ) Notice: Subject to any disclaimer, the term of this patent is extended or adjusted under 35 U.S.C. 154(b) by 168 days.

(21) Appl. No.: 14/356,034

(22) PCT Filed: Nov. 1, 2012

(86) PCT No.: PCT/JP2012/078359
§ 371 (c)(1),
(2) Date: May 2, 2014

(87) PCT Pub. No.: WO2013/065795
PCT Pub. Date: May 10, 2013

(65) Prior Publication Data
US 2014/0367523 A1    Dec. 18, 2014

(30) Foreign Application Priority Data

Nov. 2, 2011 (JP) ................................. 2011-241170

(51) Int. Cl.
*B64G 1/36* (2006.01)
*B64G 1/66* (2006.01)
(Continued)

(52) U.S. Cl.
CPC . *B64G 1/66* (2013.01); *B64G 1/32* (2013.01); *B64G 1/40* (2013.01); *B64G 1/646* (2013.01); *B64G 1/648* (2013.01); *B64G 3/00* (2013.01); *B64G 1/26* (2013.01); *B64G 1/36* (2013.01)

(58) Field of Classification Search
CPC ....................................................... B64G 1/646
USPC ........................................................ 244/172.4
See application file for complete search history.

(56) References Cited

U.S. PATENT DOCUMENTS 4,709,454 A * 12/1987 Barnes ...................... F16B 1/00
                                                  24/573.11
6,299,107 B1 * 10/2001 Kong ..................... B64G 1/646
                                                  244/172.4
(Continued)

FOREIGN PATENT DOCUMENTS

JP    2004-098959 A    4/2004
JP       3809524 B2    6/2006
(Continued)

OTHER PUBLICATIONS

International Search Report, PCT/JP2012/078359, Jan. 30, 2013, 2 pgs.
(Continued)

*Primary Examiner* — Brian M O'Hara
*Assistant Examiner* — Keith L Dixon
(74) *Attorney, Agent, or Firm* — Volpe and Koenig, P.C.

(57) ABSTRACT

Provided are a space debris removing device and a method which enable easy installation of a deceleration device to space debris undergoing a tumbling motion. The space debris removing device includes: a propulsion device (3) for performing approach and attitude control on target debris (1); a capture device (4) having a harpoon (41) which can be ejected toward the target debris (1); an observation device (5) for calculating a capture position (E) and a capture attitude at which the harpoon (41) can be driven into a tank (11) (hollow portion) of the target debris (1) by observing a motion of the target debris (1); a deceleration device (6) directly or indirectly connected to the harpoon (41), for decelerating the target debris (1); and a body part (21) on which the propulsion device (3), the capture device (4), the observation device (5), and the deceleration device (6) are mounted.

18 Claims, 16 Drawing Sheets

(51) Int. Cl.
*B64G 1/32* (2006.01)
*B64G 1/40* (2006.01)
*B64G 1/64* (2006.01)
*B64G 3/00* (2006.01)
*B64G 1/26* (2006.01)

(56) References Cited

U.S. PATENT DOCUMENTS

| | | | | |
|---|---|---|---|---|
| 6,655,637 | B1* | 12/2003 | Robinson | B64G 1/007 244/172.4 |
| 7,104,505 | B2* | 9/2006 | Tchoryk | B64G 1/646 244/115 |
| 7,513,459 | B2* | 4/2009 | Cepollina | B64G 1/007 244/158.6 |
| 7,575,199 | B2* | 8/2009 | D'Ausilio | B64G 1/007 244/171.1 |
| 8,210,480 | B2* | 7/2012 | Moorer | B64G 1/1078 244/158.4 |
| 8,226,046 | B2* | 7/2012 | Poulos | B64G 1/646 244/158.1 |
| 8,464,983 | B2* | 6/2013 | Knirsch | B64G 1/1078 244/158.2 |

FOREIGN PATENT DOCUMENTS

| | | |
|---|---|---|
| JP | 2010-285137 A | 12/2010 |
| WO | 2011/066233 A2 | 6/2011 |

OTHER PUBLICATIONS

Japanese Office Action, Japanese Patent Application No. 2013-541842, 3 pgs. (Japanese language only).

Nishida, Shinichiro, et al., "Approach to Technology of Space Debris Deorbiting," National Aerospace Laboratory of Japan, Nov. 26, 2009, pp. 575-580, with English translation, https://www.jstage.jst.go.jp/article/sicej1962/41/8/41_8_575/article/-char/ja/.

Canadian Office Action, Canadian Patent Application No. 2,853,892, Jun. 10, 2015, 5 pgs.

Loughman, J., "Overview and Analysis of the SOLDIER Satellite Concept for Removal of Space Debris," American Institute of Aeronautics and Astronautics SPACE 2010 Conference & Exposition, Anaheim, California, Aug. 30-Sep. 2, 2010, 5pgs.

* cited by examiner

SPACE DEBRIS REMOVING DEVICE AND SPACE DEBRIS REMOVING METHOD

TECHNICAL FIELD

The present invention relates to a space debris removing device and a space debris removing method, and relates in particular to a space debris removing device and a space debris removing method that are suitable for removing relatively large-sized space debris such as a used satellite or rocket orbiting the earth.

BACKGROUND ART

Currently, satellites for various purposes, such as military satellites, communication satellites, scientific satellites, observation satellites and navigation satellites, are orbiting the earth. When the satellites fail and become non-functional or end their duty and reach the end of their service life, the satellites are often left in orbit as they are and become space debris. Also, wreckage of a rocket or the like used for launching a satellite or the like is also left in orbit as space debris. Currently, several thousand pieces of space debris or more are in orbit and a phase of self-reproduction in which the number of pieces is increased by natural collisions has started. In order to stop the self-reproduction of the space debris, at least about 5 pieces of space debris need to be removed yearly. Space debris is attracted by terrestrial gravitation, and falls and disappears eventually, however, a gravity fall requires many years and it is not efficient. So, a method for positively removing space debris is already proposed (for instance, see Patent Document 1 and Patent Document 2).

In a space debris removing method described in Patent Document 1, a pressure receiving device for receiving a fine amount of atmosphere and solar light radiation pressure is configured by a circular or polygonal film material, and by attaching the pressure receiving device to space debris already orbiting in space or a spacecraft to be launched hereafter through a string, an important orbit is protected by a fall to the ground or orbit change of the space debris or the spacecraft after use. For attachment of the pressure receiving device, a method of driving a harpoon or a method of attaching the pressure receiving device by a robot arm is used.

In a space debris removing method described in Patent Document 2, a tether device for space debris orbit conversion including a conductive tether which is attached to space debris such as a broken satellite or satellite wreckage or the like and obtains force of changing the orbit of the space debris by electromagnetic interaction with a geomagnetic field is used, the tether device for the space debris orbit conversion includes a capture mechanism capable of gripping a structural part of the space debris and a tether mechanism connected to the capture mechanism and extensibly holding the tether, and after gripping the space debris by the capture mechanism, the tether is extended by the tether mechanism, the robot arm is detached, and the tether device for the space debris orbit conversion is dumped integrally with the space debris.

PRIOR ART DOCUMENT

Patent Document

Patent Document 1: Japanese Patent Laid-Open No. 2010-285137
Patent Document 2: Japanese Patent No. 3809524

SUMMARY OF THE INVENTION

Problems to be Solved by the Invention

Now, the space debris is generally orbiting while undergoing an irregular rotating motion (tumbling motion). Therefore, how a deceleration device such as the pressure receiving device or a tether device is to be attached to such space debris undergoing the tumbling motion becomes a problem. In particular, when using a robot arm, it is needed to prevent the robot arm from colliding with the space debris, and control is complicated. However, this point is not sufficiently examined in the space debris removing methods described in Patent Document 1 and Patent Document 2.

The present invention has been made in view of the problems, and has an object to provide a space debris removing device and a space debris removing method, capable of easily attaching a deceleration device to the space debris undergoing the tumbling motion.

Means for Solving the Problems

According to the present invention, a space debris removing device, which removes space debris undergoing an irregular tumbling motion from an orbit by capturing and decelerating the space debris, is provided including a propulsion device for performing approach and attitude control to target debris which is the space debris to be removed, a capture device having a harpoon which can be ejected toward the target debris, an observation device for observing a motion of the target debris and calculating a capture position and a capture attitude at which the harpoon can be driven into a hollow portion of the target debris, a deceleration device directly or indirectly connected to the harpoon, for decelerating the target debris, and a body part on which the propulsion device, the capture device, the observation device and the deceleration device are mounted.

The harpoon may include a pointed end part having a barb part that can be locked to the target debris, a stopper part to be in contact with a surface of the target debris, a thrust generation part for ejecting the harpoon, and a wire for connecting the harpoon to the body part.

The barb part may be configured so as to be closed when passing through the target debris and be opened after passing through the target debris.

The harpoon may be configured such that an elastic body disposed so as to cover the pointed end part on a front surface of the stopper part is provided, and by compressing the elastic body between the target debris surface and the stopper part when the pointed end part is locked to the target debris, scattering of broken pieces generated when the harpoon passes through is suppressed.

The plurality of pointed end parts may be disposed on a surface of the stopper part and each of the pointed end parts may be configured so as to be capable of being pulled in when abutted to a location at which the pointed end part cannot pass through the surface of the target debris.

A wire winding device capable of winding the wire may be provided, and by winding the wire after locking the pointed end part to the target debris, the body part may be closely fitted to the target debris.

A buffer material for mitigating an impact when closely fitting the body part to the target debris may be disposed at the body part.

A plurality of binding legs turnably disposed at the body part may be provided, and after the body part is closely fitted to the target debris, the binding legs may be expanded to fix the body part to the target debris, and the motion of the target debris may be suppressed using the propulsion device.

The plurality of capture devices may be disposed at the body part.

The deceleration device may include a conductive tether to be discharged into space, and a distal end part disposed at a distal end of the conductive tether and provided with thrust generation means for generating thrust.

The deceleration device may include a conductive tether to be discharged into space, a distal end part disposed at a distal end of the conductive tether and provided with thrust generation means for generating thrust, and a connector for connecting a rear end of the conductive tether to the wire, and the wire may be connected to the body part through the conductive tether and the distal end part.

The conductive tether may be connected so as to be separated from the body part. Also, the distal end part may be configured by the body part.

Also, according to the present invention, a space debris removing method, which removes the space debris undergoing an irregular tumbling motion from the orbit by capturing and decelerating the space debris, is provided including an orbit injecting process of injecting the space debris removing device onto the orbit of target debris which is the space debris to be removed, an approaching process of making the space debris removing device approach the target debris, an observing and moving process of observing a motion of the target debris after the space debris removing device reaches an observation position, calculating a capture position and a capture attitude at which a harpoon can be driven into the target debris, and moving the space debris removing device to the capture position and the capture attitude, a capturing process of driving the harpoon into the target debris and connecting the space debris removing device and the target debris, and a decelerating process of decelerating the target debris by the space debris removing device.

The capturing process may include a closely fitting process of winding a wire connected to the harpoon after the harpoon is driven into the target debris, and closely fitting the space debris removing device to the target debris.

The capturing process may include a binding process of expanding binding legs disposed to the space debris removing device and binding the target debris after the space debris removing device is closely fitted to the target debris, and a motion suppressing process of suppressing a motion of the target debris by a propulsion device disposed at the space debris removal device.

The observing and moving process may calculate the capture position and the capture attitude so as to drive the harpoon into a hollow portion of the target debris.

The decelerating process may be a process of decelerating the target debris by discharging a conductive tether from the space debris removing device into space.

Advantageous Effects of the Invention

According to the space debris removing device and the space debris removing method of the present invention, by making the space debris removing device approach the target debris, calculating the capture position and the capture attitude at which the harpoon can be driven into the target debris, driving the harpoon and then decelerating the target debris, an orbit of the target debris is changed and the target debris can be made to fall down to the earth and disappear. Also, the harpoon can be driven from a position away from the target debris, and even when the target debris is undergoing the tumbling motion, the target debris can be captured in the state that the space debris removing device and the target debris do not collide, and the deceleration device can be easily attached.

Also, by closely fitting the space debris removing device to the captured target debris, the wire connected to the harpoon is not easily wound around the target debris undergoing the tumbling motion, and an operation state of the deceleration device can be stabilized. Further, by fixing the space debris removing device to the target debris by the binding legs, the tumbling motion of the target debris can be suppressed using the propulsion device, and the operation state of the deceleration device can be stabilized more.

MODE FOR CARRYING OUT THE INVENTION

Figure 1:
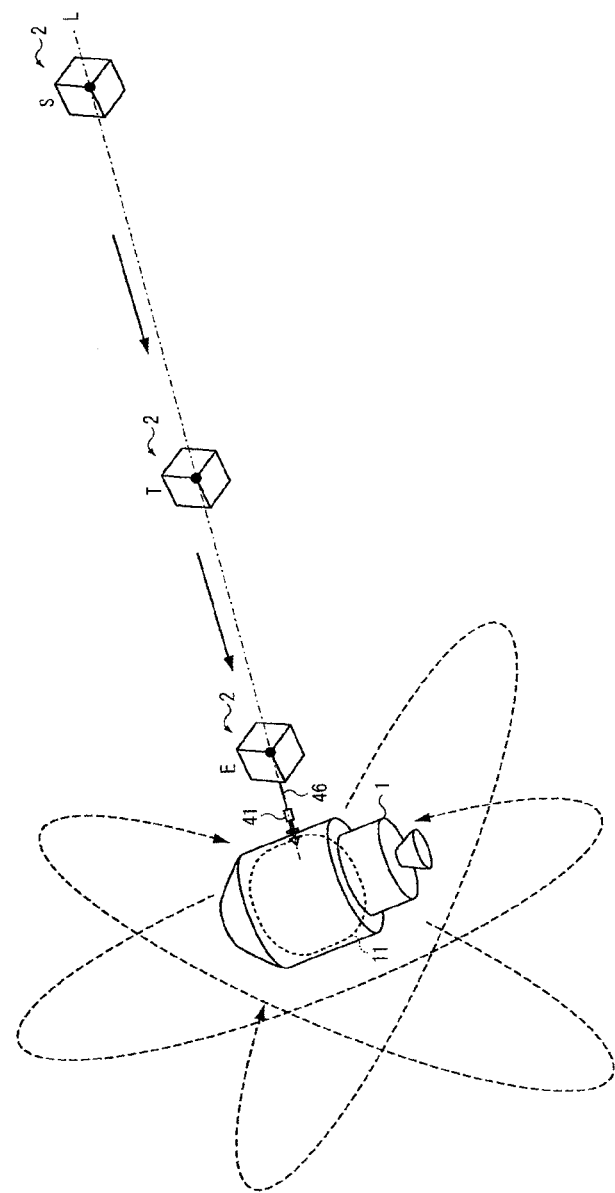
FIG. 1 is an overall schematic diagram illustrating an orbit injecting process to a capturing process of the space debris removing method according to a first embodiment of the present invention.
Figure 2:
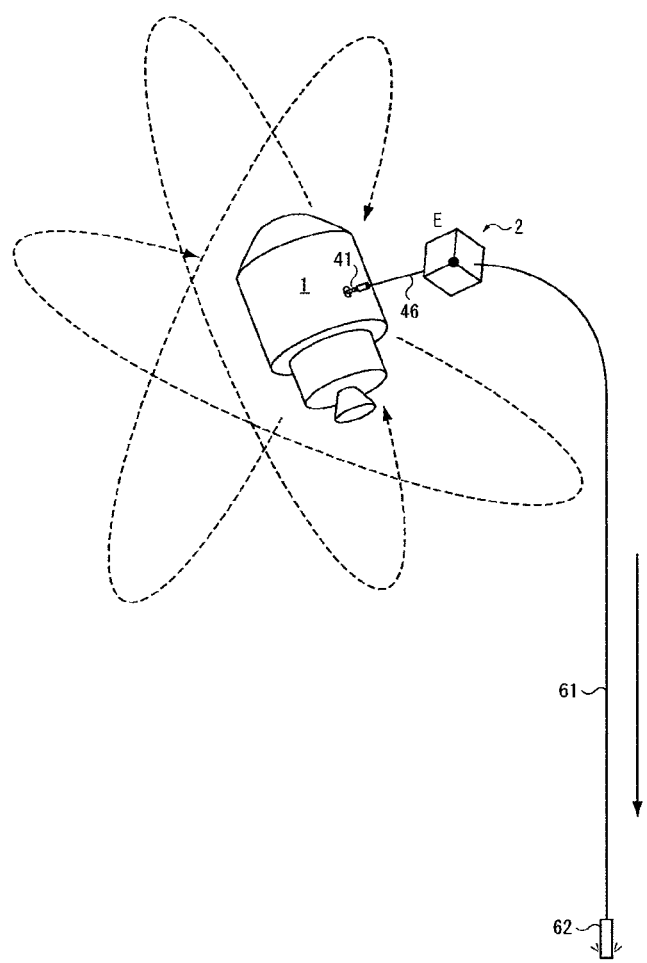
FIG. 2 is an overall schematic diagram illustrating a decelerating process of the space debris removing method according to the first embodiment of the present invention.
Figure 3:
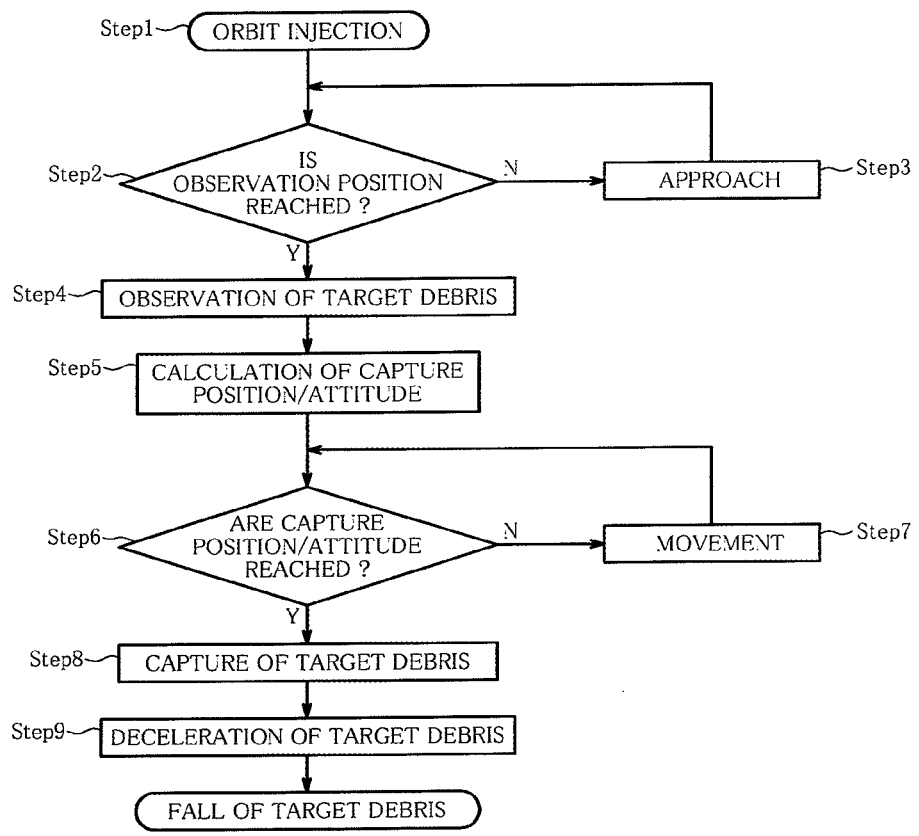
FIG. 3 is a flowchart illustrating the space debris removing method according to the first embodiment of the present invention.
Figure 4:
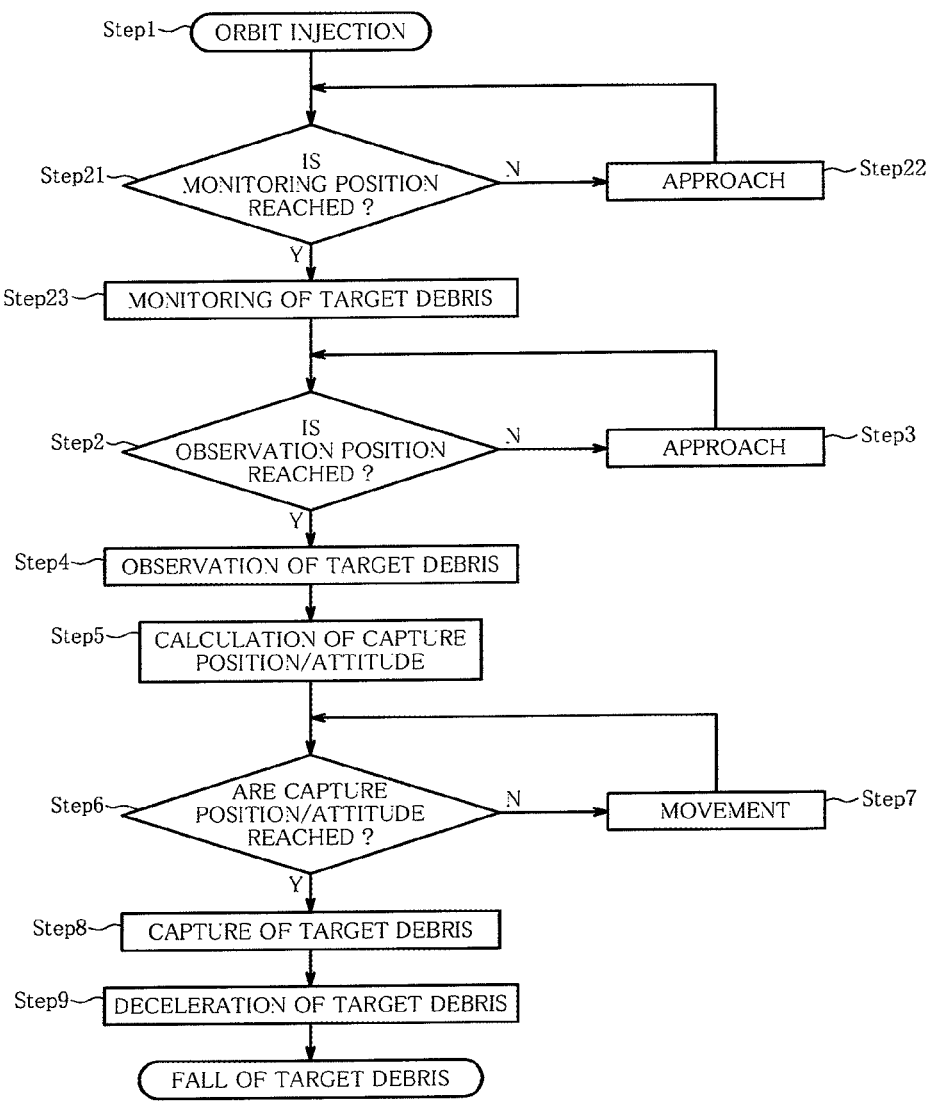
FIG. 4 is a flowchart illustrating a modification of the space debris removing method according to the first embodiment of the present invention.

Hereinafter, embodiments of the present invention will be described using FIG. 1 to FIG. 16C. Here, FIG. 1 is an overall schematic diagram illustrating an orbit injecting process to a capturing process of the space debris removing method according to a first embodiment of the present invention. FIG. 2 is an overall schematic diagram illustrating a decelerating process of the space debris removing method according to the first embodiment of the present invention. FIG. 3 is a flowchart illustrating the space debris removing method according to the first embodiment of the present invention. FIG. 4 is a flowchart illustrating a modification of the space debris removing method according to the first embodiment of the present invention.

The space debris removing method according to the first embodiment of the present invention is for removing space debris undergoing an irregular tumbling motion from an orbit by capturing and decelerating the space debris as illustrated in FIG. 1 to FIG. 3, and includes: an orbit injecting process (Step 1) of injecting a space debris removing device 2 around an orbit L of target debris 1 which is the space debris to be removed; an approaching process (Steps 2, 3) of making the space debris removing device 2 approach the target debris 1; an observing and moving process (Steps 4-7) of observing a motion of the target debris 1 after the space debris removing device 2 reaches an observation position T, calculating a capture position E and a capture attitude at which a harpoon 41 can be driven into the target debris 1, and moving the space debris removing device 2 to the capture position E and the capture attitude; a capturing process (Step 8) of driving the harpoon 41 into the target debris 1 and connecting the space debris removing device 2 and the target debris 1; and a decelerating process (Step 9) of decelerating the target debris 1 by the space debris removing device 2.

The target debris 1 is, as illustrated in FIG. 1, irregularly rotating while orbiting on the orbit L. That is, the target debris 1 is orbiting on the orbit L while undergoing an irregular tumbling motion. Therefore, when attaching a deceleration device by a robot arm, a driving timing and a driving direction of the robot arm need to be controlled so that the robot arm does not collide with the target debris 1, and calculation and control become complicated. On the other hand, in the present invention, collision of the target debris 1 and the space debris removing device 2 can be suppressed since the target debris 1 is captured by driving the harpoon 41 from the capture position E at which the space debris removing device 2 does not collide with the target debris 1.

The orbit injecting process (Step 1) is the process of disposing the launched space debris removing device 2 around the orbit L of the target debris 1. Specifically, the space debris removing device 2 is injected into a range from which the space debris removing device 2 can reach the orbit L by itself. For instance, the space debris removing device 2 is injected to a position lower than the orbit L, and gradually approaches the orbit L by centrifugal force while approaching the target debris 1 by using a propulsion device.

The space debris removing device 2 is in a shape of a small-sized satellite having the size of about several tens cm to several m, for instance, and may be launched alone from the earth or may be launched in the form of sharing a ride with a main satellite as a piggy bag satellite. The target debris 1 which is to be removed is basically set beforehand, the orbit L is measured from the earth, and the space debris removing device 2 is launched so as to be injected around the orbit L. Adjustment in orbit injection is processed by the propulsion device mounted in the space debris removing device 2 on the basis of information of GPS (Global Positioning System).

The approaching process (Steps 2, 3) is the process of making the space debris removing device 2 approach the observation position T of the target debris 1. The observation position T is, for instance, set at a position about 30-500 m away from the target debris 1 on the orbit L. The space debris removing device 2 moves from an injection position S to the observation position T while recognizing a position of the device itself and a position of the target debris 1 by using the GPS or the like. At the time, the space debris removing device 2 checks whether or not the observation position T is reached (Step 2), approaches the target debris 1 (Step 3) when the observation position T is not reached (N), and advances to the next process when the observation position T is reached (Y)

The observing and moving process (Steps 4-7) is the process of making the space debris removing device 2 approach the capture position E of the target debris 1. The space debris removing device 2 which reaches the observation position T observes the target debris 1 by an observer such as a CCD camera or a laser radar (Step 4), and estimates a motion model of the target debris 1. By the estimated result, the capture position E and the capture attitude for driving the harpoon 41 to the target debris 1 are calculated (Step 5). The capture position E is a position at which the target debris 1 undergoing the tumbling motion and the space debris removing device 2 do not collide for instance, and is set at a position about several m to several tens m away from the target debris 1. The capture position E may be a position off the orbit L of the target debris 1. The capture attitude means a state of being set to a direction from which the harpoon 41 can be driven into a part where the harpoon 41 is desired to be driven into the target debris 1.

Also, the space debris removing device 2 may calculate the capture position E and the capture attitude so as to drive the harpoon 41 into a hollow portion such as a tank 11 of the target debris 1. By driving the harpoon 41 into the hollow portion such as the tank 11, the harpoon 41 can be easily locked to the target debris 1. Also, the capture position E and the capture attitude may be such a position and attitude that the harpoon 41 can be substantively vertically driven into the surface of the target debris 1, or may be such a position and attitude that the harpoon 41 can be driven into a position with little fluctuation such as a fixed point in the estimated motion model of the target debris 1.

After the capture position E and the capture attitude are calculated, the space debris removing device 2 autonomously moves to the capture position E and the capture attitude using the propulsion device. At the time, the space debris removing device 2 checks whether or not the capture position/attitude are reached (Step 6), moves toward the capture position E and the capture attitude (Step 7) when the capture position E and the capture attitude are not reached (N), and advances to the next process when the capture position E and the capture attitude are reached (Y).

The capturing process (Step 8) is the process of driving the harpoon 41 into the target debris 1 and capturing the target debris 1. The harpoon 41 is connected with the space debris removing device 2 by a wire 46, and when the harpoon 41 is locked to the target debris 1, the state that the target debris 1 and the space debris removing device 2 are connected by the wire 46 is attained. By adopting a system of capturing the target debris 1 by driving the harpoon 41 in such a manner, in the state of disposing the space debris removing device 2 at a position and an attitude (the capture position E and the capture attitude) for not colliding with the target debris 1 undergoing the tumbling motion, the harpoon 41 can be driven so as not to collide with the target debris 1. Thus, compared to other systems (for instance, the system of performing gripping by a robot arm), a mechanism and calculation for determining the capture position E and the capture attitude can be simplified or saved in terms of labor, a performance demanded for an observation/capture mechanism of the space debris removing device 2 can be mitigated, processing burdens on a controller can be reduced, and the target debris 1 and the space debris removing device 2 can be easily connected.

The decelerating process (Step 9) is the process of decelerating the target debris 1 by the space debris removing device 2 and accelerating or controlling a fall to the earth. The decelerating process is, for instance, the process of decelerating the target debris 1 by discharging a conductive tether 61 from the space debris removing device 2 into space. Means for decelerating the target debris 1 may be pressure receiving means which receives a radiation pressure of the solar wind or solar light or the like.

As illustrated in FIG. 2, the conductive tether 61 may include a distal end part 62 disposed at a distal end and provided with thrust generation means for generating thrust. Since the distal end part 62 includes the thrust generation means, the conductive tether 61 can be guided into a direction in which expansion is desired, and expansion of the conductive tether 61 can be stabilized. For the thrust generation means, a small-sized rocket motor, a cold gas jet using nitrogen or liquefied alternative fluorocarbon or the like, a monopropellant, electric propulsion of a pulsed plasma thruster, and a propulsion device utilizing a sublimate such as camphor or the like can be used.

By discharging the conductive tether 61 from the space debris removing device 2, Lorentz force acts on the conductive tether 61 from relationship between a current flowing to the conductive tether 61 and a magnetic field where the conductive tether 61 is expanded, and the conductive tether 61 is pulled in a direction opposite to an advancing direction of the target debris 1, thereby decelerating the target debris 1. Therefore, by controlling a length of the conductive tether 61 and a size of the current, the fall of the target debris 1 can be accelerated or controlled.

In a flowchart illustrated in FIG. 4, flow from orbit injection (Step 1) to reaching the observation position T (Step 2) is carried out stepwise. In order to observe the motion of the target debris 1 and estimate the motion model, an observer (for instance, a CCD camera or a laser radar or the like) capable of accurately recognizing the motion of the target debris 1 is required. In order to observe the target debris 1 by the observer, it is preferable to approach a position of about several tens m, for instance. Also, an injection position S at which the space debris removing device 2 is injected to the orbit is often a position at least several hundreds m to several thousands m away from the target debris 1, and a moving distance to the observation position T is long. At the beginning after the space debris removing device 2 is injected to the orbit, it is preferable to use a GPS in order to recognize its own position. However, it is difficult to accurately predict the position of the target debris 1 on the basis of normal observation data from the ground, and sometimes it is difficult to accurately guide the space debris removing device 2 to the observation position T. Then, when the space debris removing device 2 approaches the target debris 1, the observation position T may be reached while monitoring the position of the target debris 1 by itself.

Specifically, the space debris removing device 2 has a monitoring device such as a laser radar mounted thereon, and the space debris removing device 2 checks whether or not a monitoring position at which the GPS is to be switched to the monitoring device is reached (Step 21), approaches the target debris 1 by using the GPS (Step 22) when the monitoring position is not reached (N), and switches from the GPS to monitoring of the target debris 1 by the monitoring device (Step 23) when the monitoring position is reached (Y). Thereafter, the space debris removing device 2 approaches while measuring a direction and a distance of the target debris 1 by the monitoring device, and advances to the next process (Step 2). Also, the processes after the Step 2 are the same as in a flowchart illustrated in FIG. 3.

Figure 5A:
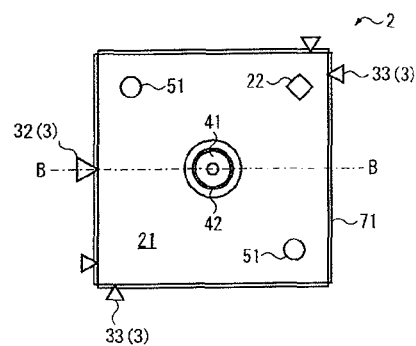
FIG. 5A is a schematic diagram illustrating the space debris removing device according to the first embodiment of the present invention, illustrates a front view.
Figure 5B:
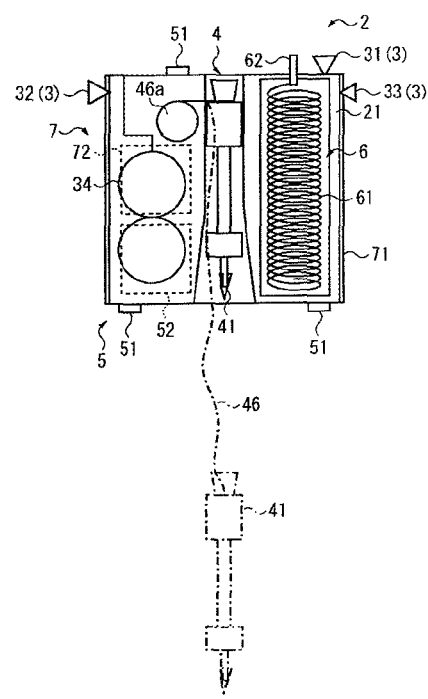
FIG. 5B is a schematic diagram illustrating the space debris removing device according to the first embodiment of the present invention, illustrates a B-B cross sectional view in FIG. 5A.
Figure 6A:
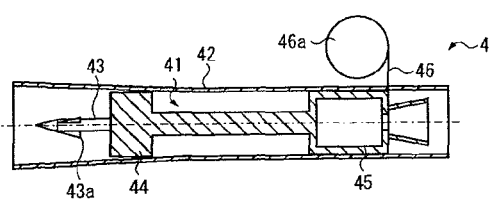
FIG. 6A is a diagram illustrating a capture device, illustrates an overall schematic diagram.
Figure 6B:
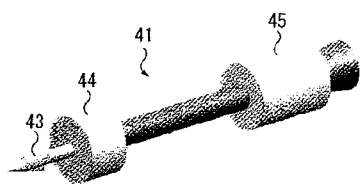
FIG. 6B is a diagram illustrating a capture device, illustrates a perspective view of a harpoon.
Figure 6C:
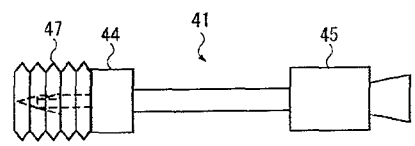
FIG. 6C is a diagram illustrating a capture device, illustrates a first modification of the harpoon.
Figure 6D:
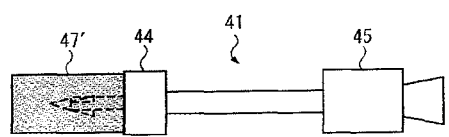
FIG. 6D is a diagram illustrating a capture device, illustrates a second modification of the harpoon.
Figure 6E:
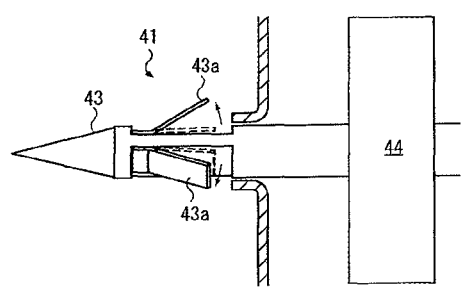
FIG. 6E is a diagram illustrating a capture device, illustrates a third modification of the harpoon.
Figure 7A:
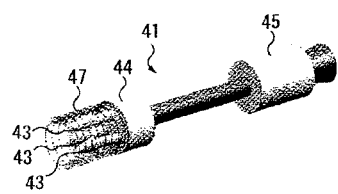
FIG. 7A is a diagram illustrating modifications of the harpoon, illustrates a fourth modification.
Figure 7B:
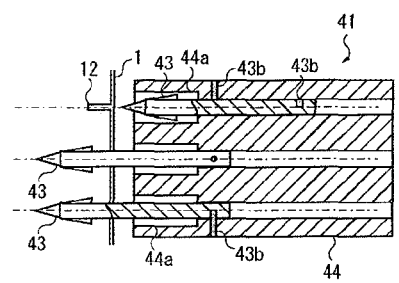
FIG. 7B is a diagram illustrating modifications of the harpoon, illustrates a fifth modification.
Figure 7C:
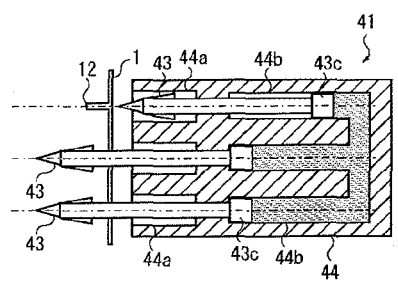
FIG. 7C is a diagram illustrating modifications of the harpoon, illustrates a sixth modification.
Figure 7D:
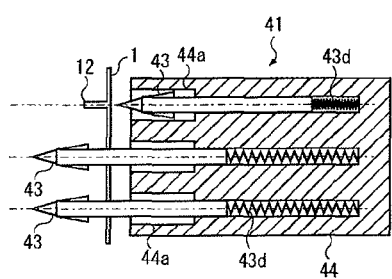
FIG. 7D is a diagram illustrating modifications of the harpoon, illustrates a seventh modification.
Figure 8A:
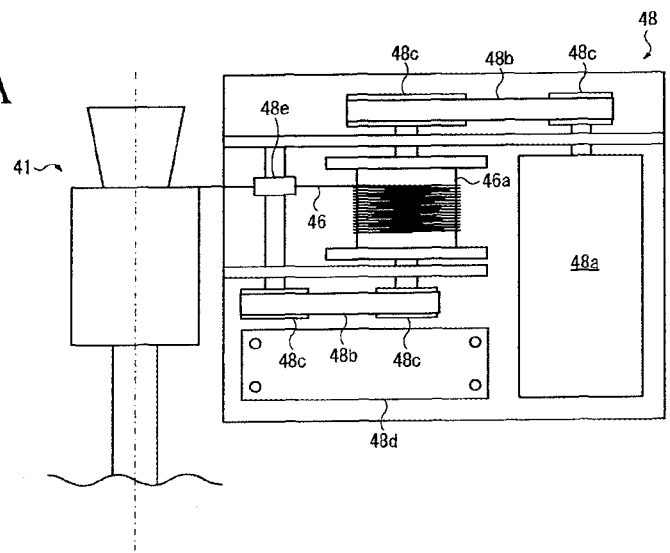
FIG. 8A is a diagram illustrating a storage state of the harpoon, illustrates a schematic diagram when including a wire winding device.
Figure 8B:
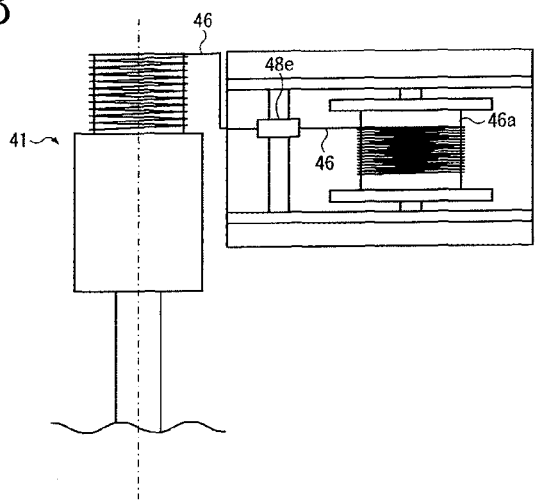
FIG. 8B is a diagram illustrating a storage state of the harpoon, illustrates a schematic diagram when not including the wire winding device.

Next, the space debris removing device according to the first embodiment of the present invention will be described. Here, FIGS. 5A and 5B are a schematic diagram illustrating the space debris removing device according to the first embodiment of the present invention, FIG. 5A illustrates a front view, and FIG. 5B illustrates a B-B cross sectional view in FIG. 5A. FIGS. 6A to 6E are a diagram illustrating a capture device, FIG. 6A illustrates an overall diagram, FIG. 6B illustrates a perspective view of a harpoon, FIG. 6C illustrates a first modification of the harpoon, FIG. 6D illustrates a second modification of the harpoon, and FIG. 6E illustrates a third modification of the harpoon. FIGS. 7A to 7D are a diagram illustrating modifications of the harpoon, FIG. 7A illustrates a fourth modification, FIG. 7B illustrates a fifth modification, FIG. 7C illustrates a sixth modification, and FIG. 7D illustrates a seventh modification. FIGS. 8A and 8B are a diagram illustrating a storage state of the harpoon, FIG. 8A illustrates a schematic diagram when including a wire winding device, and FIG. 8B illustrates a schematic diagram when not including the wire winding device.

The space debris removing device 2 according to the first embodiment of the present invention is, as illustrated in FIGS. 5A and 5B, the space debris removing device which removes space debris undergoing an irregular tumbling motion from an orbit by capturing and decelerating the space debris, and includes: a propulsion device 3 for performing approach and attitude control to the target debris 1 (see FIG. 1) which is the space debris to be removed; a capture device 4 having the harpoon 41 which can be ejected toward the target debris 1; an observation device 5 for observing a motion of the target debris 1 and calculating the capture position E and the capture attitude at which the harpoon 41 can be driven into a hollow portion such as the tank 11 of the target debris 1; a deceleration device 6 directly or indirectly connected to the harpoon 41, for decelerating the target debris 1; a body part 21 on which the propulsion device 3, the capture device 4, the observation device 5 and the deceleration device 6 are mounted; and a power supply device 7 charged by a solar battery panel 71 disposed on an outer surface of the body part 21, for supplying power to devices mounted in the body part 21.

The propulsion device 3 is a device used for the approach to the target debris 1 of the space debris removing device 2 (the body part 21), movement to the capture position E and the capture attitude, and attitude control of the body part 21, etc. Specifically, the propulsion device 3 includes, for instance, a main direction thruster 31 described in FIG. 5B, a side thruster 32 and a thruster 33 for the attitude control described in FIG. 5A, and a propellant tank 34 for generating a gas to be jetted from the thrusters, etc. The configuration of the propulsion device 3 is just an example, and is not limited to the configuration illustrated in the figure.

The capture device 4 is a device which has the harpoon 41 that can be ejected from a launcher 42 formed or installed at the body part 21 and connects the target debris 1 and the space debris removing device 2 (the body part 21). The harpoon 41 includes, as described in FIG. 5B and FIGS. 6A and 6B, a pointed end part 43 having a barb part 43a that can be locked to the target debris 1, a stopper part 44 to be in contact with the surface of the target debris 1, a thrust generation part 45 for ejecting the harpoon 41, and the wire 46 for connecting the harpoon 41 to the body part 21. Also, the capture device 4 may include an ejecting direction adjusting mechanism (for instance, a gimbal mechanism or the like) for adjusting or finely adjusting an ejecting direction of the harpoon 41.

The pointed end part 43 is constituted of a metal having strength enough to pass through the surface of the target debris 1, and has a pointed distal end. The barb part 43a may be constituted of a back surface of a plurality of triangular blade members formed on a side face of the pointed end part 43 or may be constituted of a conical bottom surface part.

The stopper part 44 is for regulating the harpoon 41 so as not to pass through the target debris 1. When the harpoon 41 passes through the front and back of the target debris 1, there is the possibility of generating extra broken pieces (debris) when the harpoon 41 gets off to the outside. Also, in the case that an oxidizing agent remains when the harpoon 41 reaches an oxidizing agent tank inside the target debris 1, there is the possibility of causing an explosion. Then, in order to lock the harpoon 41 to the surface of the target debris 1, for instance, the harpoon 41 is driven toward the tank 11 (hollow portion) such as a fuel tank or an empty oxidizing agent tank, and the stopper part 44 is formed at the harpoon 41.

The thrust generation part 45 is for adding thrust to the harpoon 41. The thrust generation part 45 is constituted of a rocket motor with solid propellant or the like, for instance. Also, the launcher 42 has a hollow passing through the body part 21, and is configured such that, when the thrust generation part 45 is operated, the reaction is not easily added to the body part 21. The launcher 42 is not necessarily required to be built in the body part 21 and may be configured so as to be externally attached to the surface of the body part 21.

The wire 46 is a member for connecting the harpoon 41 and the body part 21, and is the member for connecting the target debris 1 and the body part 21 (the space debris removing device 2) by the harpoon 41 locked to the target debris 1. The wire 46 has a length of several m to several tens m, for instance, and when the harpoon 41 is stored, is turned to the state of being wound to a wire drum 46a to suppress the fall of the harpoon 41. When ejecting the harpoon 41, the wire 46 is delivered from the wire drum 46a accompanying the advance of the harpoon 41. Also, the harpoon 41 may be locked to the launcher 42 by a shear pin or a retractable stopper to perform positioning or suppress the fall.

Here, modifications of the harpoon 41 will be described. The first modification of the harpoon 41 illustrated in FIG. 6C includes a cylindrical body 47 (elastic body) disposed so as to cover an outer periphery of the pointed end part 43 on a front surface of the stopper part 44, and is configured to form a closed space by compressing the cylindrical body 47 between the surface of the target debris 1 and the stopper part 44 when the pointed end part 43 is locked to the target debris 1. The cylindrical body 47 has a bellows structure, for instance. By disposing the cylindrical body 47, scattering of broken pieces such as heat insulating material generated when the harpoon 41 passes through can be suppressed. The cylindrical body 47 is configured into a substantively cylindrical shape for instance, but may be configured into a truncated conical cylindrical shape in which the diameter of a distal end side is enlarged.

The second modification of the harpoon 41 illustrated in FIG. 6D includes a fiber body 47' (elastic body) disposed so as to cover the pointed end part 43 on the front surface of the stopper part 44, and is configured to suppress scattering of broken pieces generated when the harpoon 41 passes through by compressing the fiber body 47' (elastic body) between the surface of the target debris 1 and the stopper part 44 when the pointed end part 43 is locked to the target debris 1. As the fiber body 47', when the coarse one is used, the broken pieces to scatter can be entwined and caught by the fiber body 47', and when the fine one is used, the broken pieces to scatter can be held between the fiber body 47' and the surface of the target debris 1. Light and strong aramid fibers or the like are formed into a sponge shape for the fiber body 47', for instance, and the elastic body may be a resin like sponge or a metal such as steel wool, instead of the fiber body 47'.

In the third modification of the harpoon 41 illustrated in FIG. 6E, the barb part 43a of the pointed end part 43 is configured so as to be closed when passing through the target debris 1 and be opened after passing through the target debris 1. In the third modification, the barb part 43a is constituted of a leaf spring member, for instance, and is configured so as to be extended and contracted in a radial direction of the harpoon 41. In order to strengthen restoration force of the barb part 43a, the elastic body of rubber or a coil spring or the like may be disposed. Also, an opening/closing mechanism of the barb part 43a is just an example, and is not limited to the configuration illustrated in the figure.

In the fourth modification of the harpoon 41 illustrated in FIG. 7A, the plurality of pointed end parts 43 are disposed on the surface of the stopper part 44. While one pointed end part 43 is disposed in the harpoon 41 illustrated in FIG. 6B, three pointed end parts 43 are disposed in the harpoon 41 illustrated in FIG. 7A. Also, on an outer periphery of the pointed end parts 43, the cylindrical body 47 may be disposed as illustrated in the figure.

The fifth to seventh modifications of the harpoon 41 illustrated in FIGS. 7B to 7D assume the case that, in the harpoon 41 including the plurality of pointed end parts 43, a part of the harpoon 41 is driven into a hard part (for instance, a part where a rib 12 configuring a reinforcing part of the target debris 1 is formed) of the target debris 1. Specifically, the respective pointed end parts 43 in the fifth to seventh modifications are configured so as to be capable of being pulled in when the surface of the target debris 1 cannot be passed through. By adopting the system, since the need of aiming at a harpoon driving position of the target debris 1 undergoing the tumbling motion avoiding the hard part such as a beam of a truss structure is eliminated, a mechanism and calculation for determining the capture position E and the capture attitude can be simplified or saved in terms of labor, the performance demanded for an observation/capture mechanism of the space debris removing device 2 can be mitigated, the processing burdens on a controller can be reduced, and the target debris 1 and the space debris removing device 2 can be easily connected.

In the fifth modification of the harpoon 41 illustrated in FIG. 7B, the pointed end part 43 is fixed to the stopper part 44 by a shear pin 43b to be broken when a fixed pressure is loaded. At the stopper part 44, a space (a storage part 44a) capable of storing the pointed end part 43 including the barb part 43a is formed. Shear force of the shear pin 43b is adjusted so as not to be broken when the pointed end part 43 collides with a plate part of the target debris 1 and so as to be broken when the pointed end part 43 collides with the hard part of the target debris 1.

In the sixth modification of the harpoon 41 illustrated in FIG. 7C, the respective pointed end parts 43 are configured to be capable of being pulled in by a gas cylinder 44b. The respective pointed end parts 43 are supported through a piston 43c inserted into the gas cylinder 44b. By the configuration, the pointed end parts 43 can be pulled in by utilizing compressibility of a gas. As illustrated in the figure, by configuring the gas cylinder 44b so as to communicate cylinder parts corresponding to the respective pointed end parts 43, by the gas compressed by a certain pointed end part 43, the other pointed end part 43 can be energized to the front. Also, the gas cylinder 44b may be disposed individually for the respective pointed end parts 43.

In the seventh modification of the harpoon 41 illustrated in FIG. 7D, the respective pointed end parts 43 are configured to be capable of being pulled in by a coil spring 43d. Elastic force of the coil spring 43d is adjusted so as not to be compressed when the pointed end part 43 collides with a plate part of the target debris 1 and so as to be compressed when the pointed end part 43 collides with the hard part of the target debris 1. Instead of the coil spring 43d, the elastic body of rubber or the like may be used.

The observation device 5 includes, for instance, an observer 51 disposed at a front part of the body part 21, and an operation part 52 for detecting the relative position and attitude of the target debris 1 and the body part 21 from video images or images or the like obtained by the observer 51, estimating the motion model of the target debris 1 from time series information of the position and the attitude, and calculating the capture position E and the capture attitude. The observer 51 is constituted of a CCD camera or a laser radar or the like capable of acquiring the tumbling motion of the target debris 1 as the video image or the image or the like. The operation part 52 is constituted of an arithmetic processing unit such as a CPU, and may include a storage device for recording the video images or the images or the like of the observer 51. The operation part 52 may be constituted of a part of a controller (not shown in the figure) of the space debris removing device 2. The controller operates the propulsion device 3 on the basis of an operation result of the observation device 5, makes the body part 21 be moved to the capture position E, and adjusts an ejecting direction (capture attitude) of the harpoon 41. Also, when the capture device 4 includes the ejecting direction adjusting mechanism, rough positioning and attitude determination may be performed in the propulsion device 3 and the ejecting direction of the harpoon 41 may be finely adjusted in the ejecting direction adjusting mechanism.

The deceleration device 6 includes, for instance, the conductive tether 61 to be discharged into space, and the distal end part 62 disposed at the distal end of the conductive tether 61 and provided with the thrust generation means for generating thrust. As described above, for the thrust generation means, a small-sized rocket motor, a cold gas jet, a one-liquid thruster, electric propulsion, and a sublimate or the like can be utilized. The conductive tether 61 is, as illustrated in the figure, stored inside a case in a coil shape, and is configured so as to be loosened into a straight shape by discharging the distal end part 62. The deceleration device 6 may be stored inside the body part 21 or may be attached externally to the surface of the body part 21.

The power supply device 7 includes, for instance, the solar battery panel 71 disposed on the outer surface of the body part 21, and a battery 72 for storing electricity generated by the solar battery panel 71. The electricity charged to the battery 72 supplies power to devices requiring the power such as the propulsion device 3, the capture device 4, the observation device 5 and the deceleration device 6 as needed through the controller.

The body part 21 is constituted of a housing similar to a so-called small-sized satellite. Other than the propulsion device 3, the capture device 4, the observation device 5, the deceleration device 6 and the power supply device 7, the body part 21 may have a monitoring device 22 such as a laser radar, a GPS sensor, a gyro, and an acceleration sensor or the like mounted thereon. Also, though not shown in the figure, the outer periphery of the body part 21 is covered with a heat insulating material.

Incidentally, the capture device 4 may include a wire winding device 48 capable of winding the wire 46, as illustrated in FIG. 8A. The wire winding device 48 includes, for instance, an electric motor 48a for generating motive power, a belt driving mechanism (a timing belt 48b and a pulley 48c) for transmitting the motive power of the electric motor 48a to a wire drum 46a, a control part 48d for controlling the motive power of the electric motor 48a, and a level winding mechanism 48e for uniformly winding the wire 46. When ejecting the harpoon 41, it is preferable to interrupt power supply to the electric motor 48a and a drive shaft is turned to a freely rotatable state. Also, a power transmission mechanism is not limited to the belt driving mechanism, and may be constituted of a gear train.

By disposing the wire winding device 48, the body part 21 can be closely fitted to the target debris 1 by winding the wire 46 after locking the pointed end part 43 to the target debris 1. Also, since there is the possibility that the wire 46 is entangled with the target debris 1 if the wire 46 is loosened between the target debris 1 and the space debris removing device 2, the wire winding device 48 may be operated so as to load the wire 46 with fixed tension and maintain a straight tense state.

When winding of the wire 46 is not needed, as illustrated in FIG. 8B, the wire winding device 48 may be omitted. In order to stabilize rewinding of the wire 46 from the wire drum 46a, the level winding mechanism 48e may be disposed. Also, the wire 46 may be not only wound around the wire drum 46a but also wound around a rear end part of the harpoon 41. Further, when the length of the wire 46 is short, the wire drum 46a may be omitted. When winding the wire 46 around the rear end part of the harpoon 41, it is preferable to wind the wire 46 from the front to the back for instance so that the wire 46 is smoothly loosened when ejecting the harpoon 41.

Figure 9A:
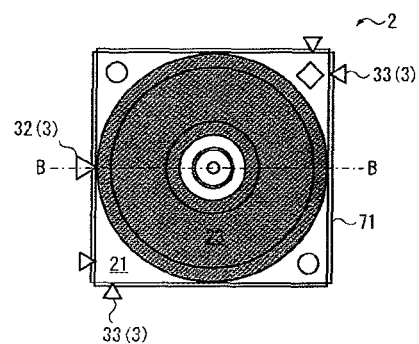
FIG. 9A is a schematic diagram illustrating the space debris removing device according to a second embodiment of the present invention, illustrates a front view.
Figure 9B:
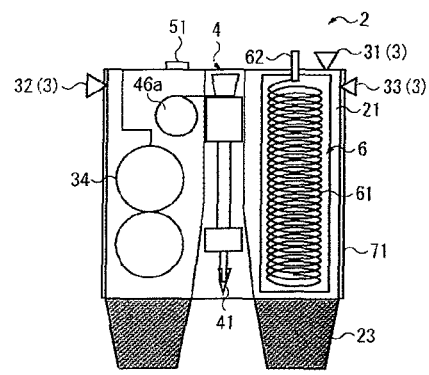
FIG. 9B is a schematic diagram illustrating the space debris removing device according to a second embodiment of the present invention, illustrates a B-B cross sectional view in FIG. 9A.
Figure 9C:
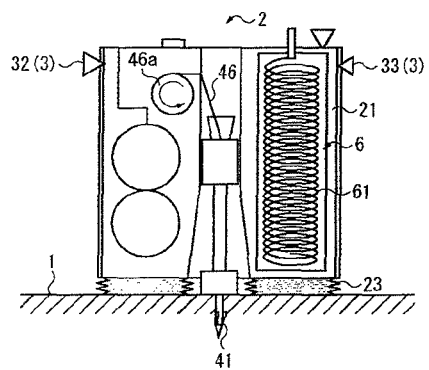
FIG. 9C is a schematic diagram illustrating the space debris removing device according to a second embodiment of the present invention, illustrates a schematic diagram illustrating a using state.
Figure 10A:
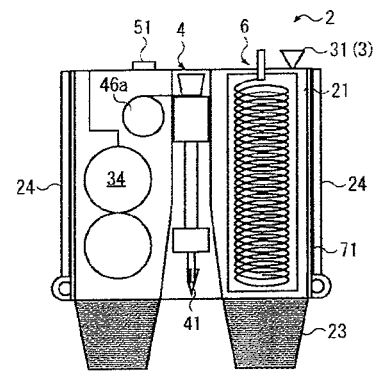
FIG. 10A is a schematic diagram illustrating the space debris removing device according to a third embodiment of the present invention, illustrates a cross sectional view.
Figure 10B:
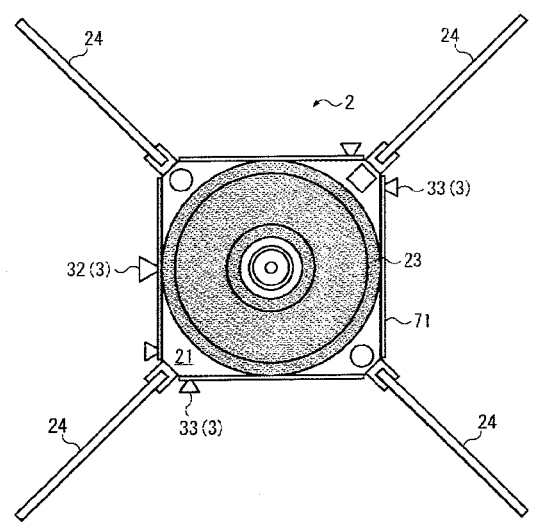
FIG. 10B is a schematic diagram illustrating the space debris removing device according to a third embodiment of the present invention, illustrates a front view.
Figure 11A:
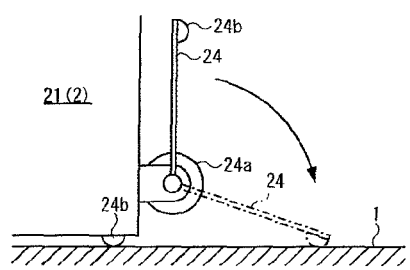
FIG. 11A is a schematic diagram illustrating binding legs, illustrates a first example.
Figure 11B:
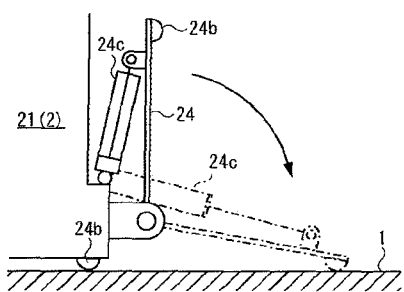
FIG. 11B is a schematic diagram illustrating binding legs, illustrates a second example.
Figure 11C:
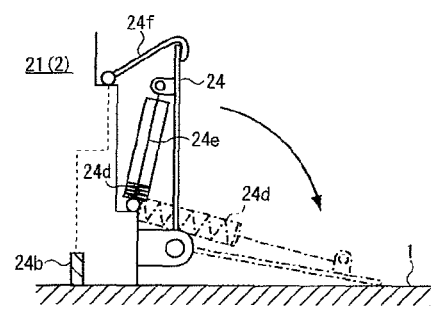
FIG. 11C is a schematic diagram illustrating binding legs, illustrates a third example.

Next, the space debris removing device 2 according to other embodiments of the present invention will be described with reference to FIG. 9A to FIG. 11C. Here, FIGS. 9A to 9C are a schematic diagram illustrating the space debris removing device according to a second embodiment of the present invention, FIG. 9A illustrates a front view, FIG. 9B illustrates a B-B cross sectional view in FIG. 9A, and FIG. 9C illustrates a schematic diagram illustrating a using state. FIGS. 10A and 10B are a schematic diagram illustrating the space debris removing device according to a third embodiment of the present invention, FIG. 10A illustrates a cross sectional view, and FIG. 10B illustrates a front view. FIGS. 11A to 11C are a schematic diagram illustrating binding legs, FIG. 11A illustrates a first example, FIG. 11B illustrates a second example, and FIG. 11C illustrates a third example. The same signs are attached to the same components as the space debris removing device 2 according to the first embodiment and redundant descriptions will be omitted.

In the space debris removing device 2 according to the second embodiment illustrated in FIGS. 9A and 9B, an annular buffer material 23 is disposed at the front part of the body part 21. The buffer material 23 is formed of a metal such as an aluminum honeycomb or a resin such as urethane rubber. By the configuration, as illustrated in FIG. 9C, when closely fitting the body part 21 to the target debris 1 by winding the wire 46 after locking the harpoon 41 to the target debris 1, an impact when the body part 21 collides with the target debris 1 can be mitigated, and breakage of the target debris 1 and a fault of the space debris removing device 2 can be suppressed.

Also, by the configuration, the space debris removing device 2 can be closely fitted to the target debris 1 even when a surface shape of the target debris 1 is a complicated shape, strict position/speed control is not required when closely fitting the space debris removing device 2 to the target debris 1 undergoing the tumbling motion, position/speed control loads when performing close fitting can be mitigated, a mechanism and calculation for determining a position/attitude/speed for performing close fitting can be simplified or saved in terms of labor, the performance demanded for an observation/capture mechanism of the space debris removing device 2 can be mitigated, the processing burdens on the controller can be reduced, and the target debris 1 and the space debris removing device 2 can be easily connected. The configuration of the buffer material 23 is not limited to the one illustrated in the figure, and may be a rectangular ring shape or the configuration of being distributed and disposed at the front part of the body part 21.

The space debris removing device 2 according to the third embodiment illustrated in FIGS. 10A and 10B includes a plurality of binding legs 24 turnably disposed at the body part 21, and after the body part 21 is closely fitted to the target debris 1, the binding legs 24 are expanded to fix the body part 21 to the target debris 1, and the motion of the target debris 1 is suppressed using the propulsion device 3. The state of closing the binding legs 24 is illustrated in FIG. 10A, and the state of opening the binding legs 24 is illustrated in FIG. 10B. By the configuration, the irregular tumbling motion of the target debris 1 can be suppressed by the binding legs 24 and the propulsion device 3, and the deceleration device can be used in a stable state. Especially, when the conductive tether 61 is used as the deceleration device 6, the conductive tether 61 can be prevented from moving wildly or getting entangled.

Also, by the configuration, the space debris removing device 2 can be bound to the target debris 1 even when the surface shape of the target debris 1 is a complicated shape, and since the degree of freedom of a position to be connected to the target debris 1 undergoing the tumbling motion (that is, a harpoon driving position) is increased, a mechanism and calculation for determining the capture position E and the capture attitude can be simplified or saved in terms of labor, the performance demanded for an observation/capture mechanism of the space debris removing device 2 can be mitigated, the processing burdens on the controller can be reduced, and the target debris 1 and the space debris removing device 2 can be easily connected. In FIG. 10B, figures of the side thruster 32 and the thruster 33 for the attitude control are omitted for convenience of descriptions.

The binding legs 24 have a configuration illustrated in FIGS. 11A to 11C for instance. In the respective figures, the figure of the buffer material 23 is omitted. Also, the configurations of the first example to the third example of the binding legs 24 are just examples, and not limited to the configurations.

In the first example illustrated in FIG. 11A, the binding leg 24 is turned by an electric motor 24a. The electric motor 24a has a brake function, and is configured to hold the binding leg 24 in a stored state and an expanded state. Also, a sensor 24b may be disposed at the body part 21 and the distal end of the binding leg 24 to sense the contact of the body part 21 and the target debris 1, thereby operating the electric motor 24a and expanding the binding leg 24, and to sense the contact of the binding leg 24 and the target debris 1, thereby stopping the electric motor 24a and locking the binding leg 24. Also, force may be continuously applied to the binding leg 24 by the electric motor 24a to fix the body part 21 to the target debris 1.

In the second example illustrated in FIG. 11B, the binding leg 24 is turned by a cylinder 24c. The cylinder 24c is pin-connected to the binding leg 24 at a distal end and pin-connected to the body part 21 at a rear end. The cylinder 24c is a hydraulic cylinder, an air cylinder or an electric cylinder or the like for instance, and is configured so as to be extended and contracted. Also, the sensor 24b may be disposed at the body part 21 and the distal end of the binding leg 24 to sense the contact of the body part 21 and the target debris 1, thereby extending the cylinder 24c and expanding the binding leg 24, and to sense the contact of the binding leg 24 and the target debris 1, thereby stopping the extension of the cylinder 24c and locking the binding leg 24. Also, force may be continuously applied to the binding leg 24 by the cylinder 24c to fix the body part 21 to the target debris 1.

In the third example illustrated in FIG. 11C, the binding leg 24 is turned by a coil spring 24d. The coil spring 24d is stored inside a container in the state of being compressed to energize a drive shaft 24e pin-connected to the binding leg 24 at the distal end, and a closed state is kept by a stopper 24f connected to the body part 21 through a latch mechanism. When the sensor 24b senses the contact of the body part 21 and the target debris 1, the stopper 24f is turned upwards, and the binding leg 24 is expanded. In the third example, even when the binding leg 24 is brought into contact with the target debris 1, force is continuously applied to the binding leg 24 by the coil spring 24d.

In the first example to the third example, while the body part 21 is fixed to the target debris 1 by continuously applying force to the binding leg 24, a locking part (for instance, a harpoon shape) to be pierced and locked to the surface of the body part 21 may be formed at the distal end of the binding leg 24, or an adhesion part to be bonded or fixed to the surface of the body part 21 by applying or discharging an adhesive agent may be formed at the distal end of the binding leg 24. Also, the binding leg 24 is not limited to the configuration of a turning type, and may be the configuration of a fixing type formed so as to be brought into contact from the body part 21 toward the target debris 1 or may have the locking part or the adhesion part formed at the distal end thereof, or the turning type and the fixing type may be used together.

Figure 12:
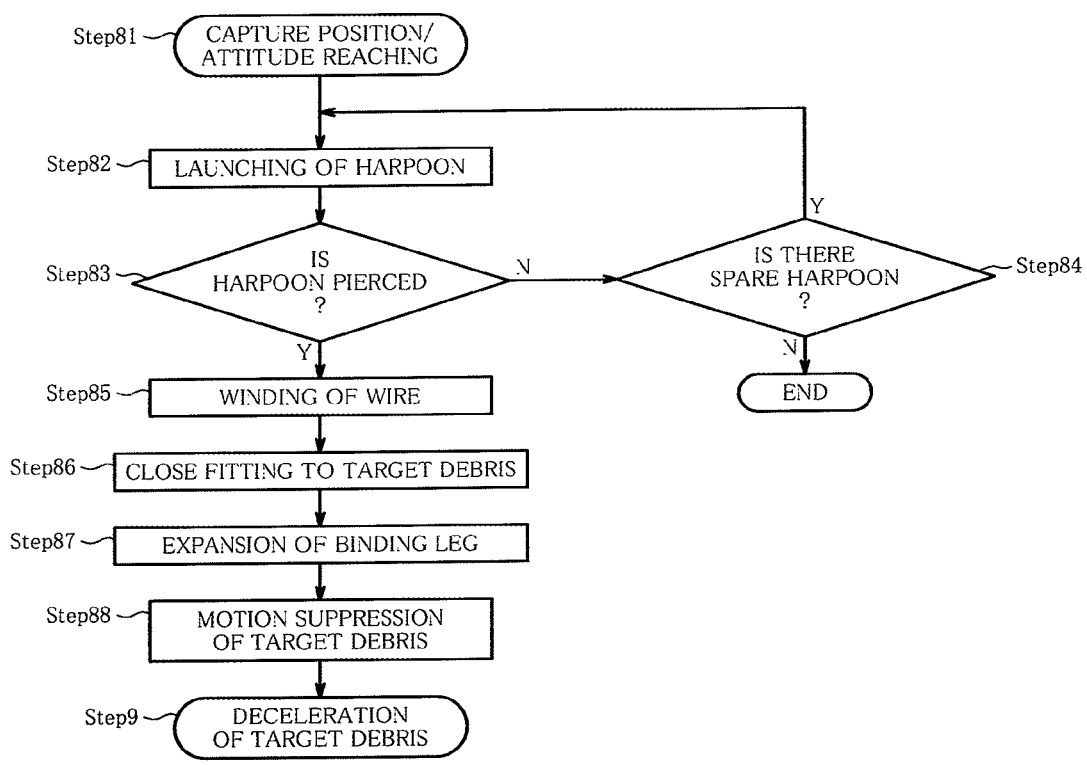
FIG. 12 is a flowchart illustrating a part of the space debris removing method according to the third embodiment of the present invention.
Figure 13:
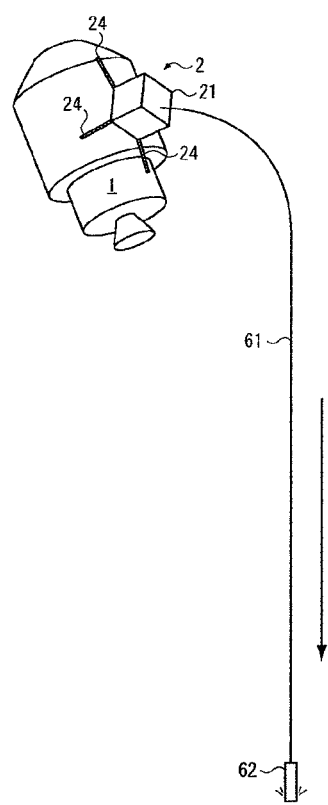
FIG. 13 is an overall schematic diagram illustrating the decelerating process of the space debris removing method according to the third embodiment of the present invention.

The space debris removing method using the space debris removing device 2 according to the third embodiment will be described. Here, FIG. 12 is a flowchart illustrating a part of the space debris removing method according to the third embodiment of the present invention. FIG. 13 is an overall schematic diagram illustrating the decelerating process of the space debris removing method according to the third embodiment of the present invention.

The flowchart illustrated in FIG. 12 illustrates the capturing process (Step 8) in detail. After the space debris removing device 2 reaches the capture position E and the capture attitude (Step 81), the space debris removing device 2 launches the harpoon 41 toward the target debris 1 (Step 82). The space debris removing device 2 checks whether or not the harpoon 41 is pierced to the target debris 1 (Step 83). Whether or not the harpoon 41 is pierced may be visually checked by the observer 51 of the observation device 5 or may be checked by the tension of the wire 46.

When the harpoon 41 is not pierced (N), whether or not there is a spare harpoon 41 is checked (Step 84). When there is no spare harpoon 41 (N), processing is ended due to a capture failure. When there is a spare harpoon 41 (Y), the harpoon 41 is launched again (Step 82).

When the harpoon 41 is pierced (Y), the wire 46 is wound by the wire winding device 48 (Step 85), and the space debris removing device 2 (the body part 21) is closely fitted to the target debris 1 (Step 86). Thereafter, the space debris removing device 2 expands the binding legs 24 (Step 87) and binds the target debris 1. Then, by appropriately jetting the main direction thruster 31, the side thruster 32 and the thruster 33 for the attitude control of the propulsion device 3, the motion of the target debris 1 is suppressed (Step 88). After the tumbling motion of the target debris 1 is calmed down, the process is shifted to the decelerating process (Step 9).

In the capturing process (Steps 81-88), for instance, when the space debris removing device 2 does not include the binding legs 24 as in the second embodiment, the process may be stopped at a closely fitting process (Step 86) of closely fitting the space debris removing device 2 to the target debris 1 by winding the wire 46 connected to the harpoon 41 after driving the harpoon 41 into the target debris 1. Also, after checking that the harpoon 41 is pierced to the target debris 1 (Steps 83-84), the subsequent processes (Steps 85-88) may be omitted to shift to the decelerating process (Step 9). By omitting the processes (Steps 85-88), since the need of the process of closely fitting the space debris removing device 2 to the target debris 1 undergoing the tumbling motion is eliminated, position/speed control when performing close fitting can be omitted, the mechanism and calculation for determining the position/attitude/speed of the space debris removing device 2 can be simplified or saved in terms of labor, the performance demanded for an observation/capture mechanism of the space debris removing device 2 can be mitigated, and the processing burdens on the controller can be reduced.

FIG. 13 illustrates the state of discharging the conductive tether 61 in the decelerating process (Step 9) after suppressing the motion of the target debris 1 by the capturing process (Steps 81-88). In such a manner, by suppressing the motion of the target debris 1 by the binding legs 24 and the propulsion device 3, the conductive tether 61 discharged into space is prevented from moving wildly or getting entangled, and a deceleration effect can be stably actuated.

Figure 14A:
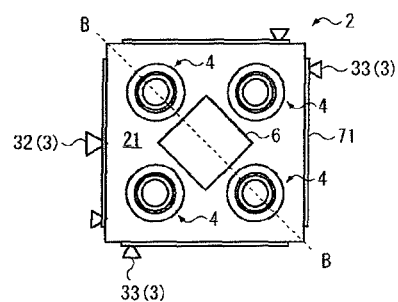
FIG. 14A is a schematic diagram illustrating the space debris removing device according to a fourth embodiment of the present invention, illustrates a rear view.
Figure 14B:
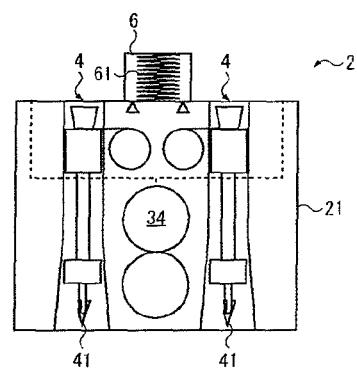
FIG. 14B is a schematic diagram illustrating the space debris removing device according to a fourth embodiment of the present invention, illustrates a B-B cross sectional view in FIG. 14A.
Figure 14C:
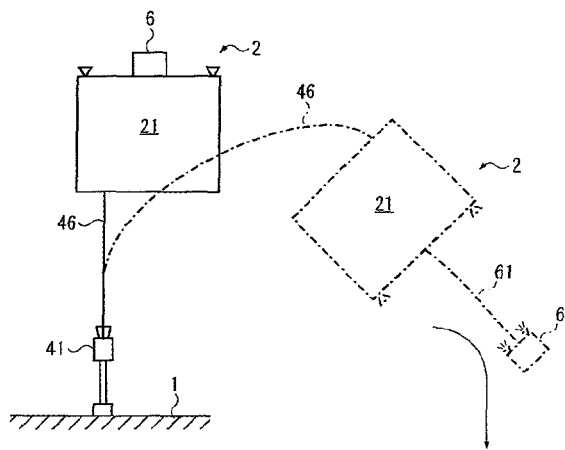
FIG. 14C is a schematic diagram illustrating the space debris removing device according to a fourth embodiment of the present invention, illustrates a schematic diagram illustrating the using state.
Figure 15A:
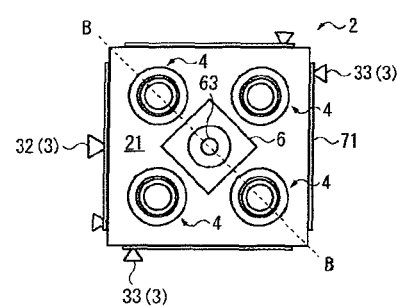
FIG. 15A is a schematic diagram illustrating the space debris removing device according to a fifth embodiment of the present invention, illustrates a rear view.
Figure 15B:
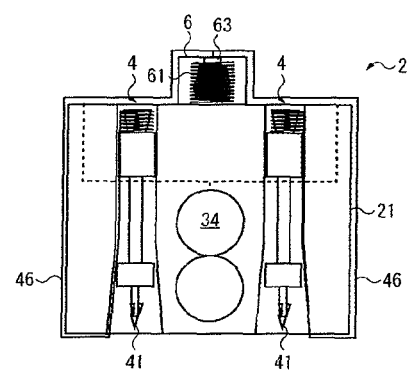
FIG. 15B is a schematic diagram illustrating the space debris removing device according to a fifth embodiment of the present invention, illustrates a B-B cross sectional view in FIG. 15A.
Figure 15C:
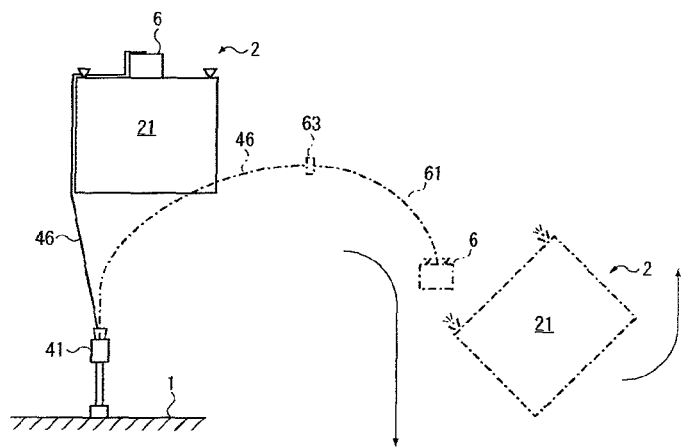
FIG. 15C is a schematic diagram illustrating the space debris removing device according to a fifth embodiment of the present invention, illustrates a schematic diagram illustrating the using state.
Figure 16A:
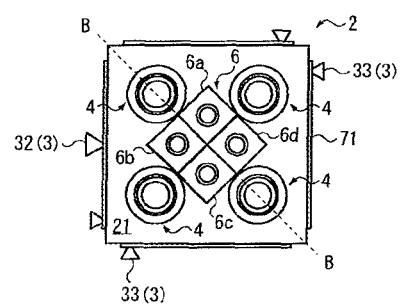
FIG. 16A is a schematic diagram illustrating the space debris removing device according to a sixth embodiment of the present invention, illustrates a rear view.
Figure 16B:
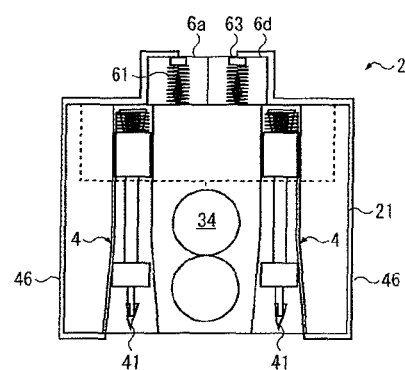
FIG. 16B is a schematic diagram illustrating the space debris removing device according to a sixth embodiment of the present invention, illustrates a B-B cross sectional view in FIG. 16A.
Figure 16C:
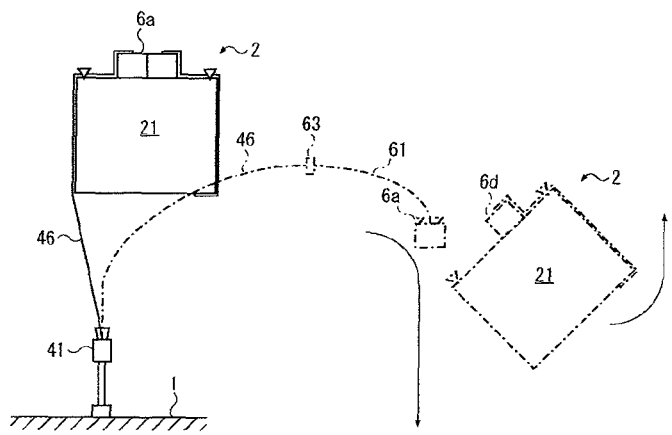
FIG. 16C is a schematic diagram illustrating the space debris removing device according to a sixth embodiment of the present invention, illustrates a schematic diagram illustrating the using state.

Subsequently, the space debris removing device 2 according to the other embodiments of the present invention will be described with reference to FIG. 14A to FIG. 16C. Here, FIGS. 14A to 14C are a schematic diagram illustrating the space debris removing device according to a fourth embodiment of the present invention, FIG. 14A illustrates a rear view, FIG. 14B illustrates a B-B cross sectional view in FIG. 14A, and FIG. 14C illustrates a schematic diagram illustrating the using state. FIGS. 15A to 15C are a schematic diagram illustrating the space debris removing device according to a fifth embodiment of the present invention, FIG. 15A illustrates a rear view, FIG. 15B illustrates a B-B cross sectional view in FIG. 15A, and FIG. 15C illustrates a schematic diagram illustrating the using state. FIGS. 16A to 16C are a schematic diagram illustrating the space debris removing device according to a sixth embodiment of the present invention, FIG. 16A illustrates a rear view, FIG. 16B illustrates a B-B cross sectional view in FIG. 16A, and FIG. 16C illustrates a schematic diagram illustrating the using state. The same signs are attached to the same components as the space debris removing device 2 according to the first to third embodiments and redundant descriptions will be omitted.

In the space debris removing device 2 according to the fourth embodiment illustrated in FIGS. 14A and 14B, the deceleration device 6 is externally attached to the surface (back surface part) of the body part 21. By disposing the deceleration device 6 outside the body part 21, a free space can be secured inside the body part 21, and the plurality of harpoons 41 can be mounted by utilizing the free space. That is, the plurality of capture devices 4 may be disposed in the body part 21. For instance, the capture devices 4 may be disposed at four parts on diagonal lines as illustrated in FIG. 14A, may be disposed at two parts on one diagonal line, may be disposed at three parts configuring vertexes of a triangle, or may be disposed at two parts in parallel. By making the capture devices 4 (harpoons 41) be redundant in such a manner, even when the first harpoon 41 is not pierced to the target debris 1, the harpoon 41 can be ejected again to capture the target debris 1, and redundancy of a capture function can be improved.

In the space debris removing device 2 according to the fourth embodiment, as illustrated in FIG. 14C, after the harpoon 41 is locked to the target debris 1, the propulsion device 3 (the main direction thruster 31, the side thruster 32, the thruster 33 for the attitude control) is used to change a direction of the body part 21, the deceleration device 6 is discharged from the body part 21, and the conductive tether 61 is expanded in space. In this embodiment, the deceleration device 6 configures the distal end part 62 which is a storage part of the conductive tether 61 and also has propulsion power. By the configuration, there is no need of disposing a complicated attitude control mechanism in the deceleration device 6, and by setting a direction of discharging the conductive tether 61 by the body part 21, cutting off the deceleration device 6 from the body part 21 and generating thrust, the conductive tether 61 can be expanded into a desired state.

In the space debris removing device 2 according to the fifth embodiment illustrated in FIGS. 15A and 15B, the deceleration device 6 is externally attached to the surface of the body part 21, and the body part 21 is utilized as the distal end part 62 of the deceleration device 6. Specifically, the wire 46 of the capture device 4 is connected with a rear end of the conductive tether 61 through a connector 63, and the conductive tether 61 and the connector 63 may be accommodated inside the deceleration device 6 fixed to the back surface part of the body part 21. That is, the space debris removing device 2 according to this embodiment has the connector 63 for connecting the conductive tether 61 and the wire 46, and the distal end part 62 is constituted of the body part 21. Also, in the stored state of the harpoon 41, the wire 46 may be extended to the deceleration device 6 at the back surface part along an outer edge part of the body part 21. The connector 63 is constituted of an electrical insulator so that static electricity or the like generated by the contact of the harpoon 41 and the target debris 1 is not transmitted to the conductive tether 61. Also, the plurality of capture devices 4 may be disposed in the body part 21 similarly to the fourth embodiment.

In the space debris removing device 2 according to the fifth embodiment, as illustrated in FIG. 15C, after the harpoon 41 is locked to the target debris 1, the propulsion device 3 (the main direction thruster 31, the side thruster 32, the thruster 33 for the attitude control) is used to change a direction of the body part 21, the body part 21 is moved in a direction in which the conductive tether 61 is desired to be expanded (for instance, a direction toward the earth) as needed while discharging the connector 63 and the conductive tether 61 from the deceleration device 6 or the body part 21, and the deceleration device 6 is separated and cut off from the body part 21. Extension is accelerated by the thrust generation means disposed in the deceleration device 6 and the conductive tether 61 is expanded into the desired state (for instance, the state of being extended in the direction toward the earth). Also, attitude controllable thrust generation means may be mounted in the deceleration device 6 to change the direction or the like by itself after separating the deceleration device 6 from the body part 21.

When the deceleration device 6 does not include the thrust generation means, the conductive tether 61 may be expanded into the desired state by moving the body part 21 in the direction in which the conductive tether 61 is desired to be expanded (for instance, the direction toward the earth) while discharging the connector 63 and the conductive tether 61 from the deceleration device 6 or the body part 21. By the configuration, the body part 21 can be used as the distal end part 62 of the deceleration device 6, and the configuration of the deceleration device 6 can be simplified.

In the space debris removing device 2 according to the sixth embodiment illustrated in FIGS. 16A and 16B, the deceleration device 6 is externally attached to the surface of the body part 21, the body part 21 is utilized as the distal end part 62 of the deceleration device 6, and a part of the deceleration device 6 is configured so as to be separated from the body part 21. Specifically, the deceleration device 6 illustrated in the fifth embodiment is divided into a plurality of devices that are a first deceleration device 6a, a second deceleration device 6b, a third deceleration device 6c and a fourth deceleration device 6d, and the first deceleration device 6a to the fourth deceleration device 6d are configured so as to be separated (cut off) from the body part 21 individually. It is preferable that a division number of the deceleration device 6 is set so as to be in one-to-one correspondence with the capture devices 4 (harpoons 41).

In the space debris removing device 2 according to the sixth embodiment, as illustrated in FIG. 16C, after the harpoon 41 is locked to the target debris 1, the propulsion device 3 (the main direction thruster 31, the side thruster 32, the thruster 33 for the attitude control) is used to change the direction of the body part 21, the body part 21 is moved in a direction in which the conductive tether 61 is desired to be expanded (for instance, the direction toward the earth) as needed while discharging the connector 63 and the conductive tether 61 from the deceleration device 6 (for instance, the first deceleration device 6a), and the first deceleration device 6a is separated and cut off from the body part 21. Extension is accelerated by the thrust generation means disposed in the first deceleration device 6a and the conductive tether 61 is expanded into the desired state (for instance, the state of being extended in the direction toward the earth). Also, the attitude controllable thrust generation means may be mounted in the first deceleration device 6a to change the direction or the like by itself after separating the first deceleration device 6a from the body part 21.

In the meantime, the space debris removing device 2 moves toward the next target debris 1 by using the propulsion device 3. By the configuration, two or more pieces of the target debris 1 can be removed by one space debris removing device 2, and work efficiency can be improved. Also, when the first deceleration device 6a does not include the thrust generation means, the space debris removing device 2 may be moved toward the next target debris 1 by separating and cutting off the first deceleration device 6a from the body part 21 after the conductive tether 61 is expanded by the space debris removing device 2.

In the space debris removing device 2 illustrated in FIG. 14A to FIG. 16C, figures are omitted for the detail of the observation device 5 and the power supply device 7, etc., however, they are certainly configured so as to be stored inside the body part 21 similarly to the first embodiment.

The present invention is not limited to the above-described embodiments and is, of course, variously changeable in the range of not deviating from the purpose of the present invention.

EXPLANATION OF REFERENCE SIGNS

1 Target debris
2 Space debris removing device
3 Propulsion device
4 Capture device
5 Observation device
6 Deceleration device
7 Power supply device
11 Tank (hollow portion)
21 Body part
24 Binding leg
41 Harpoon
43 Pointed end part
43a Barb part
44 Stopper part
45 Thrust generation part
46 Wire
47 Cylindrical body (elastic body)
47' Fiber body (elastic body)
48 Wire winding device
61 Conductive tether
62 Distal end part
63 Connector
71 Solar battery panel

The invention claimed is:

1. A space debris removing device which removes space debris undergoing an irregular tumbling motion from an orbit by capturing and decelerating the space debris, comprising:
a propulsion device for performing approach and attitude control to target debris which is the space debris to be removed;
a capture device having a harpoon which can be ejected toward the target debris;
an observation device for observing a motion of the target debris and calculating a capture position and a capture attitude at which the harpoon can be driven into a hollow portion of the target debris;
a deceleration device directly or indirectly connected to the harpoon, for decelerating the target debris; and
a body part on which the propulsion device, the capture device, the observation device and the deceleration device are mounted, wherein the harpoon includes a pointed end part having a barb part that can be locked to the target debris, a stopper part to be in contact with a surface of the target debris, a thrust generation part for ejecting the harpoon, a wire for connecting the harpoon to the body part and an elastic body disposed so as to cover the pointed end part on a front surface of the stopper part, and by compressing the elastic body between the target debris surface and the stopper part when the pointed end part is locked to the target debris, scattering of broken pieces generated when the harpoon passes through is suppressed.

2. The space debris removing device according to claim 1, wherein the barb part is configured so as to be closed when passing through the target debris and be opened after passing through the target debris.

3. The space debris removing device according to claim 1, wherein the plurality of pointed end parts are disposed on a surface of the stopper part and each of the pointed end parts is configured so as to be capable of being pulled in when abutted to a location at which the pointed end part cannot pass through the surface of the target debris.

4. The space debris removing device according to claim 1, wherein a wire winding device capable of winding the wire is provided, and by winding the wire after locking the pointed end part to the target debris, the body part is closely fitted to the target debris.

5. The space debris removing device according to claim 4, wherein a buffer material for mitigating an impact when closely fitting the body part to the target debris is disposed at the body part.

6. The space debris removing device according to claim 4, wherein a plurality of binding legs turnably disposed at the body part are provided, and after the body part is closely fitted to the target debris, the binding legs are expanded to fix the body part to the target debris, and the motion of the target debris is suppressed using the propulsion device.

7. The space debris removing device according to claim 1, wherein the plurality of capture devices are disposed at the body part.

8. The space debris removing device according to claim 1, wherein the deceleration device includes a conductive tether to be discharged into space, and a distal end part disposed at a distal end of the conductive tether and provided with thrust generation means for generating thrust.

9. The space debris removing device according to claim 1, wherein the deceleration device includes a conductive tether to be discharged into space, a distal end part disposed at a distal end of the conductive tether and provided with thrust generation means for generating thrust, and a connector for connecting a rear end of the conductive tether to the wire, and the wire is connected to the body part through the conductive tether and the distal end part.

10. The space debris removing device according to claim 8, wherein the conductive tether is connected so as to be separated from the body part.

11. The space debris removing device according to claim 8, wherein the body part is utilized as the distal end part.

12. A space debris removing method which removes space debris undergoing an irregular tumbling motion from an orbit by capturing and decelerating the space debris, comprising:

an orbit injecting process of injecting a space debris removing device around an orbit of target debris which is the space debris to be removed;

an approaching process of making the space debris removing device approach the target debris;

an observing and moving process of observing a motion of the target debris after the space debris removing device reaches an observation position, calculating a capture position and a capture attitude at which a harpoon can be driven into the target debris, and moving the space debris removing device to the capture position and the capture attitude;

a capturing process of driving the harpoon into the target debris and connecting the space debris removing device and the target debris; and a decelerating process of decelerating the target debris by the space debris removing device, wherein the harpoon includes a pointed end part having a barb part that can be locked to the target debris, a stopper part to be in contact with a surface of the target debris, a thrust generation part for ejecting the harpoon, a wire for connecting the harpoon to the space debris removing device, and an elastic body disposed so as to cover the pointed end part on a front surface of the stopper part, and by compressing the elastic body between the target debris surface and the stopper part when the pointed end part is locked to the target debris, scattering of broken pieces generated when the harpoon passes through is suppressed.

13. The space debris removing method according to claim 12, wherein the capturing process includes a closely fitting process of winding a wire connected to the harpoon after the harpoon is driven into the target debris, and closely fitting the space debris removing device to the target debris.

14. The space debris removing method according to claim 13, wherein the capturing process includes a binding process of expanding binding legs disposed to the space debris removing device and binding the target debris after the space debris removing device is closely fitted to the target debris, and a motion suppressing process of suppressing a motion of the target debris by a propulsion device disposed at the space debris removal device.

15. The space debris removing method according to claim 12, wherein the observing and moving process calculates the capture position and the capture attitude so as to drive the harpoon into a hollow portion of the target debris.

16. The space debris removing method according to claim 12, wherein the decelerating process is a process of decelerating the target debris by discharging a conductive tether from the space debris removing device into space.

17. The space debris removing device according to claim 9, wherein the conductive tether is connected so as to be separated from the body part.

18. The space debris removing device according to claim 9, wherein the body part is utilized as the distal end part.

* * * * *